(12) United States Patent
Bech

(10) Patent No.: US 6,474,434 B1
(45) Date of Patent: Nov. 5, 2002

(54) DRIVE WHEEL

(75) Inventor: Mogens Ilsted Bech, Birkerød (DK)

(73) Assignee: Borringis Industrie AG, Arlesheim (CH)

( * ) Notice: Subject to any disclaimer, the term of this patent is extended or adjusted under 35 U.S.C. 154(b) by 0 days.

(21) Appl. No.: 09/446,989

(22) PCT Filed: Jun. 30, 1998

(86) PCT No.: PCT/DK98/00289

§ 371 (c)(1),
(2), (4) Date: Dec. 30, 1999

(87) PCT Pub. No.: WO99/01298

PCT Pub. Date: Jan. 14, 1999

(30) Foreign Application Priority Data

Jul. 2, 1997 (DK) .............................................. 0790/97

(51) Int. Cl.[7] .............................................. B60K 17/30
(52) U.S. Cl. ...................... 180/252; 180/253; 180/21; 180/23; 180/408
(58) Field of Search ................................ 180/252, 253, 180/254, 255, 263, 209, 12, 13, 7.1, 257, 408, 23, 21; 280/638, 98, 103; 301/1, 5.1

(56) References Cited

U.S. PATENT DOCUMENTS 3,387,681 A   6/1968   Rabjohn (List continued on next page.)

FOREIGN PATENT DOCUMENTS

| DE | 35 45 481 A1 | 7/1987 |
|---|---|---|
| DE | 35 45 429 A1 | 8/1987 |
| EP | 0 008 585 | 3/1980 |
| EP | 0 026 098 | 4/1981 |
| EP | 0 075 877 | 4/1983 |
| EP | 0 196 643 | 10/1996 |
| EP | 0 738 945 A2 | 10/1996 |
| EP | 0 769 286 A2 | 4/1997 |
| FR | 2 473 423 | 1/1980 |
| GB | 2 091 178 A | 7/1982 |
| GB | 2 043 554 A | 10/1985 |
| GB | 2 156 475 A | 10/1985 |
| GB | 2 174 340 A | 11/1986 |
| GB | 2 184 987 A | 7/1987 |
| GB | 2 184 988 A | 7/1987 |
| JP | 73029698 B | * 2/1973 |
| JP | 61-200003 A | * 9/1989 |
| WO | 91/18577 | 12/1991 |
| WO | 93/20791 | 10/1993 |
| WO | 96/13395 | 5/1996 |
| WO | 97/032288 | 1/1997 |

OTHER PUBLICATIONS

Abstract of JapanesePatent Application No. JP 9028742 A, published Jul. 1, 1997.

Primary Examiner—Brian L. Johnson
Assistant Examiner—Daniel Yeagley
(74) Attorney, Agent, or Firm—Wenderoth, Lind & Ponack, L.L.P.

(57) ABSTRACT

A drive wheel 10 is shown to include a support member 12 and, a wheel member 11 having a surface contacting portion 18 extending about a periphery of the wheel member 11. A drive shaft 24 includes a drive device 25 arranged to engage a drive surface 26 on the wheel member 11 such that the wheel member 11 can be rotatably driven relative to the support member 12. When the drive device 25 is engaged with the drive surface 26, a line of engagement 27 is defined along portions of the drive device 25 and the drive surface 26 that engage with one another. This line of engagement 27 forms an acute angle with the longitudinal axis 24a of the drive shaft 24 such that when the drive wheel 10 is traveling over a traveling surface 19, the line of engagement 27 intersects a part of the surface contacting portion 18 that contacts the traveling surface (this intersection is shown at 28), whereby the part of the surface contacting portion 18 that contacts the traveling surface is spaced from an intersection of the steering axis and the traveling surface 19.

51 Claims, 7 Drawing Sheets

U.S. PATENT DOCUMENTS

| | | | | |
|---|---|---|---|---|
| 3,608,661 A | * | 9/1971 | Arnot | 180/10 |
| 3,825,087 A | * | 7/1974 | Wilson | 180/6.48 |
| 3,938,608 A | * | 2/1976 | Folco-Zambelli | 180/21 |
| 3,955,826 A | * | 5/1976 | Riedesel | 280/35 |
| 4,042,070 A | | 8/1977 | Flannelly | |
| 4,125,908 A | | 11/1978 | Vail et al. | |
| 4,411,329 A | * | 10/1983 | Stedman | 180/7.1 |
| 4,461,367 A | * | 7/1984 | Eichinger et al. | 180/252 |
| 4,463,821 A | | 8/1984 | Falamak | |
| 4,519,466 A | | 5/1985 | Shiraishi | |
| 4,527,951 A | | 7/1985 | Trier | |
| 4,533,998 A | * | 8/1985 | Falamak | 364/424 |
| 4,657,104 A | * | 4/1987 | Holland | 180/211 |
| 4,683,973 A | | 8/1987 | Honjo et al. | |
| 4,733,737 A | * | 3/1988 | Falamak | 74/665 |
| 4,822,245 A | | 4/1989 | Aubry et al. | |
| 4,852,679 A | | 8/1989 | Fry | |
| 4,935,651 A | | 6/1990 | Hong et al. | |
| 4,995,679 A | | 2/1991 | Segerljung | |
| 5,649,605 A | * | 7/1997 | Ronne et al. | 180/23 |
| 5,964,471 A | * | 10/1999 | Copland | 280/47.11 |

* cited by examiner

DRIVE WHEEL

FIELD OF THE INVENTION

The present invention relates to a drive wheel and a chassis for wheeled vehicles such as wheelchairs.

BACKGROUND OF THE INVENTION

It has long been understood that wheels can assist in the transport of vehicles. However, vehicles having traditional wheels do suffer from a number of disadvantages that occasionally make such wheels unsuitable for particular applications. One instance where traditional wheels can present problems is on wheelchairs used for the transportation of temporarily or permanently disabled persons. Using traditional wheels, such wheelchairs can typically be quite cumbersome to operate and often cannot negotiate a twisting pathway that could, for example, be easily negotiated by a person on foot.

A number of wheels and wheeled assemblies have been developed that do allow vehicles, such as wheelchairs, to negotiate paths that would otherwise be not possible with traditional wheels. An example of one particular arrangement is described in International Publication Number WO 93/20791. This application describes a wheeled chassis having at least one driven wheel. The wheel is connected to the chassis by a steerable support that extends from the chassis perpendicularly to the ground over which the wheel is designed to travel. The wheel itself comprises a bearing block mounted to the steering support and a wheel member that is rotatable relatively to the bearing block. The wheel has a tread member extending about its periphery that is the portion of the wheel that contacts the surface while the wheel is travelling over the ground. The wheel described in this application is characterised in that where the tread of the wheel makes contact with the surface on which it is travelling, it is longitudinally aligned with the axis of the steerable support.

While being a suitable arrangement for many applications, corrective steering movements are often still required when the assembly is in the proximity of a physical obstacle, such as an item of furniture.

A further assembly is described in European Patent Specification EP 0 414 671 which comprises a driven wheel which is obliquely arranged with respect to a surface over which it is designed to travel and which has at its periphery a partial spherical tread surface. For propelling the vehicle, the assembly includes a first drive shaft about which is mounted concentrically a drive gear that is provided for steering the assembly. In the assembly, the rotation of the drive shaft is not directly transmitted to the wheel but instead is transmitted through a transmission arrangement formed by three gear wheels to a second drive shaft that is connected to the rim of the wheel. The tread of this wheel is also not longitudinally aligned with the axis of the drive gear for the steering assembly.

The present invention is directed to an alternative drive wheel and chassis assembly to those described above.

SUMMARY OF THE INVENTION

According to a first aspect, the present invention consists in a drive wheel for traveling on a surface comprising a support member, a wheel member and a drive shaft. The drive shaft has a drive device engaging a drive surface on the wheel member to rotatably drive the wheel member relative to the support member. The drive shaft has a longitudinal axis and the engagement of the drive device and drive surface define in vertical cross-section a line of engagement that is at an acute angle relative to the longitudinal axis. And, the wheel member has a surface contacting portion extending about its periphery and positioned such that it is intersected by the line of engagement substantially at where it contacts the surface.

The support member can have a substantially hemispherical outer surface with the wheel member rotatable about an axle extending normal to an inner surface of the hemispherical member. The wheel member can comprise a frusto-spherical portion extending between first and second surfaces, the first surface having a larger cross-sectional diameter than that of the second surface and also being the drive surface of the wheel member. The surface contacting portion can also extend about the periphery of the frusto-spherical portion adjacent the first surface. The surface contacting portion can be fabricated from an elastomeric material, such as polyurethane and can have a curved outer surface.

In one embodiment, the drive shaft can extend substantially normal to the surface over which the wheel is intended to travel and be rotated relative to its longitudinal axis by a driving device.

The drive device can comprise a gear member adjacent one end of the drive shaft having teeth disposed thereon that are adapted to engage with corresponding teeth on the first or drive surface of the wheel member.

In a preferred embodiment, the gear member can comprise a conical bevel pinion adapted to engage with the teeth on the wheel member. In cross-section, the line of engagement preferably is at an angle of between about 10° and about 25° to the longitudinal axis of the drive shaft.

In a further embodiment, the support member of the wheel can be mounted to a support shaft. The support shaft can be rotatable about its longitudinal axis with the rotation of the support shaft about its longitudinal axis being controlled by a steering device, such as a steering motor. In a preferred embodiment, the drive shaft can extend through the support shaft.

The steering device and driving device can constitute part of or be controlled by a control unit for the wheel.

As the surface contacting portion of the wheel according to the present invention is not aligned with the longitudinal axis of the support shaft, any steering correction of the drive wheel while the drive shaft is stationary does not result in the wheel twisting frictionally with respect to the ground. Rather, the surface contacting portion travels in the path of a small circle about the longitudinal axis of the drive shaft thereby keeping that axis stationary. This is an advantage of the present wheel as it serves to lessen wear on the surface, such as a carpet, on which the wheel is turning. It also substantially lessens the strain imposed on the torque capability of the steering device and so reduces the drain on any power source used for the assembly, such as batteries.

The wheel according to the present invention also has a number of advantages over the prior art described above, including:

(i) no intermediate gear wheel having an axle that is journalled in a support arm is required to reverse the rotation of the wheel relative to the drive shaft in order to correctly compensate for rotation of the steering drive gear;

(ii) the distance between the axis of the drive shaft and the surface contacting portion of the wheel is relatively small, thereby lessening the eccentric load on the mechanical support system of the assembly; and finally (iii) the drive gear on the drive surface of the wheel member can have a diameter that is a significant proportion of the effective diameter of the wheel, thereby reducing the load on the drive device for any given drive force.

According to a second aspect, the present invention consists in a chassis having at least one drive wheel for traveling on a surface. The drive wheel comprises a support member, a wheel member and a drive shaft. The drive shaft has a drive device adapted to engage with a drive surface on the wheel member and thereby rotatably drive the wheel member relative to the support member. The drive shaft has a longitudinal axis and the engagement of the drive device and the drive surface define in vertical cross-section a line of engagement that is at an acute angle to the longitudinal axis. And, the wheel member has a surface contacting portion extending about its periphery and positioned such that it is intersected by the line of engagement substantially at where it contacts the surface.

Each support member in the second aspect also preferably has a substantially hemispherical outer surface with the wheel member being rotatable about an axle extending normal to an inner surface of the hemispherical member. Each wheel member also preferably comprises a frusto-spherical portion extending between first and second surfaces. The first surface has a larger cross-sectional diameter than the second surface and also is the drive surface of the wheel member. The surface contacting portion preferably extends about the periphery of the frusto-spherical portion adjacent the first surface. The surface contacting portion can be fabricated from an elastomeric material and have a curved outer surface.

In the chassis, the drive shaft of each driven wheel can be substantially normal to the surface over which the chassis is designed to travel. Each drive shaft can also be rotated relative to its longitudinal axis by a driving device.

In a preferred embodiment of the second aspect, each drive shaft of the drive wheels on the chassis extends through a corresponding one of the support shafts.

The drive device in the second aspect can comprise a gear member adjacent one end of the drive shaft having teeth disposed therein that are adapted to engage with corresponding teeth on the first or drive surface of the wheel member. In a preferred embodiment, the gear member can comprise a conical bevel pinion adapted to engage with the teeth on the first or drive surface of the wheel member. In cross-section, the line of engagement preferably is at an angle of between 10° and 25° relative to the vertical longitudinal axis of the drive shaft.

The support member for each driven wheel on the chassis can be mounted to a support shaft with the support shafts being preferably rotatable about their respective longitudinal axes. The rotation of each support shaft is preferably controlled by its own steering device.

The chassis according to the second aspect also preferably has a controlling device for controlling the operation of the steering device and the drive shaft. The controlling device can further include an operator-actuated device for controlling the movement of the chassis. In one embodiment, the operator-actuated device can comprise a joystick that allows the operator to control the movement of the chassis in a forwards and backwards direction, a sideways direction and also to turn the chassis as desired.

The motion of the chassis according to the second aspect of the present invention can be controlled by at least three signal transmitters, including:

an x-potentiometer for the longitudinal command;

a y-potentiometer for the sideways command; and a $\omega_p$-potentiometer for the ration command.

The at least three signal transmitters in this embodiment are preferably combined in a joystick.

In a further embodiment, the chassis can include a control system in which a correction factor is added to the signals received from the signal transmitters if the signals received from the signal transmitters result in the wheel velocity being less than a predetermined minimum velocity while the chassis velocity is greater than a predetermined maximum velocity so as to avoid instability in the chassis which would occur due to the wheel velocity suddenly shifting in direction.

The chassis according to the second aspect of the present invention is preferably for any wheeled vehicle adapted to carry a load. The wheeled vehicle can be selected from the group consisting of a wheelchair, patient hoist, shower chair, commode chair, transport chair, walking aid, fork lift, pallet mover, work table, robot, distribution trolley, mobile platform for camera and lighting equipment, luggage and shopping trolleys, hospital beds and cabinets, hospital waste containers, construction vehicles, earth moving vehicles, mining vehicles, and bomb disposal vehicles.

In a further aspect, the present invention comprises a chassis having at least two drive wheels, with at least one drive wheel being mounted on a first drive carriage and at least one drive wheel mounted on a second drive carriage of the chassis characterized in that the drive wheels on the respective first and second carriages can move relatively towards and away from each other.

In one embodiment of this further aspect, the drive carriages each have lateral members that telescopically or otherwise engage with respect to each other on movement of the drive wheels relatively towards and away from each other. The lateral members can telescopically or otherwise engage within a housing disposed between the drive wheels. In one embodiment, the housing remains midway between the drive wheels on movement of the drive wheels relatively towards and away from each other.

In a preferred embodiment of the further aspect, each drive wheel can comprise a drive wheel as defined herein as the first aspect of the present invention. In a further preferred embodiment, the chassis can comprise a chassis as defined herein as the second aspect of the present invention.

BRIEF DESCRIPTION OF THE DRAWINGS

By way of example only, a preferred embodiment of the present invention is now described with reference to the accompanying drawings, in which.

PREFERRED MODE OF CARRYING OUT THE INVENTION

Figure 1:
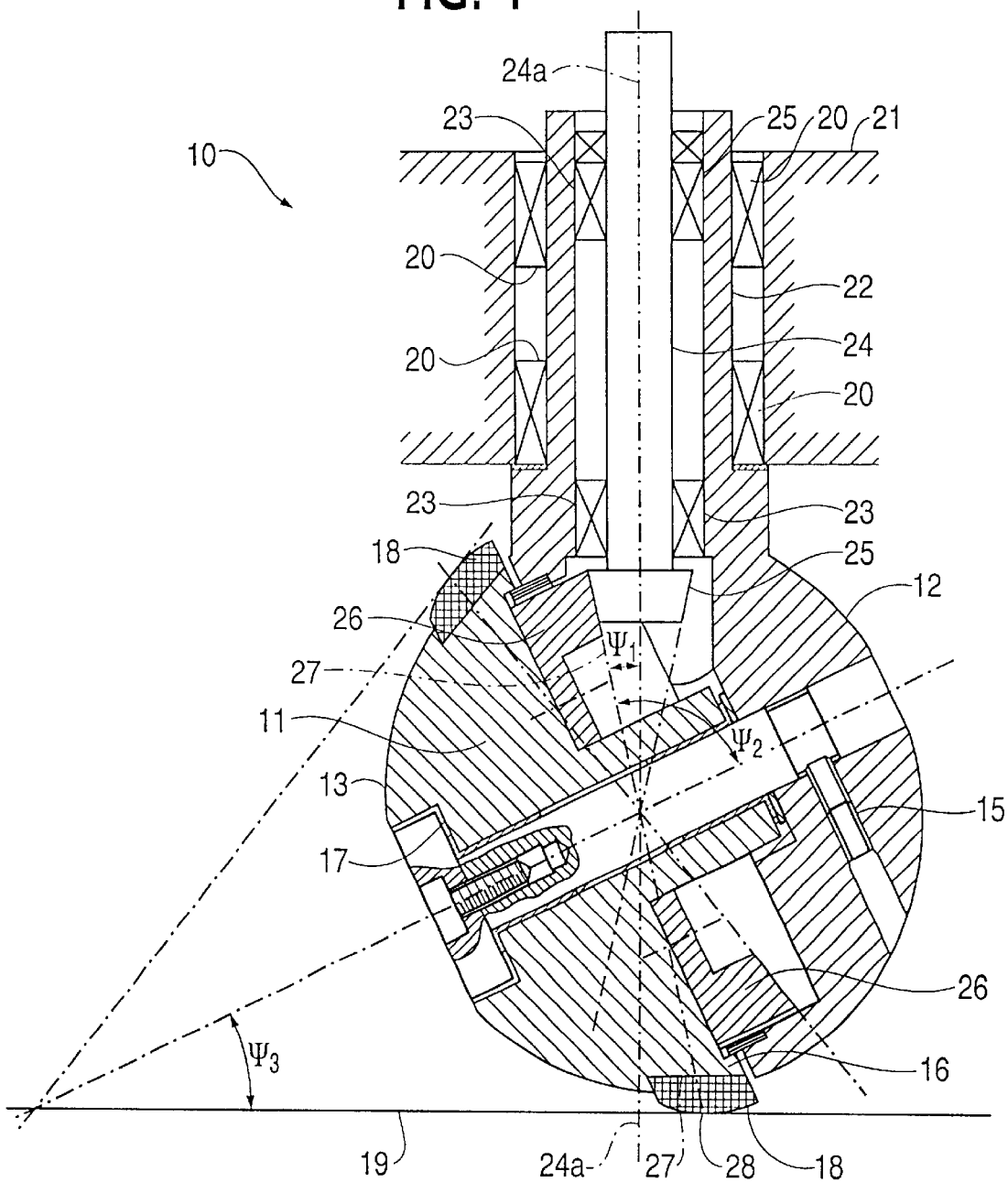
FIG. 1 is a simplified vertical cross-sectional view of a drive wheel according to the present invention mounted to a chassis.

A drive wheel according to the present invention is generally depicted as 10 in FIG. 1. The drive wheel 10 includes a wheel member 11 capable of rotating relative to a support block or member 12 about an axle that is fixed to the support block 12 by screw 15. The wheel member 11 has a frusto-spherical outer surface 13 and a first surface 16 and a second surface 17. Extending about the periphery of the wheel member 11 adjacent the first surface 16 is an elastomeric tread 18 having curved outer surface defining a rolling line 28 that contacts the surface 19 over which the wheel member 11 travels when in use.

Extending downwardly from a chassis 21 on bearings 20, a steering or support shaft 22 is mounted between the chassis 21 and the support block 12. In the depicted embodiment, it can be seen that the steering shaft 22 and support block 12 comprise 10 one integral member of the wheel. Mounted concentrically on bearings 23 within the shaft 22 is a drive shaft 24 that is rotatable relative to the steering shaft 22. The rotation of the drive shaft 24 is controlled by a drive motor as known in the art (not depicted) that would be mounted on the chassis 21. The rotation of the steering shaft 22 is controlled by a steering device as known in the art (not depicted) that would also be mounted on the chassis 21. Both the drive motor and steering device could comprise part of a control unit for the drive wheel 10 mounted on the chassis. The operation of a control unit for a chassis having drive wheels according to the present invention is provided in more detail below.

The end of the drive shaft 24 adjacent the wheel member 11 has a conical bevel pinion 25 or drive device that is engaged with the teeth of a corresponding crown wheel 26 or device surface disposed on the first surface 16 of the wheel member 11. In other words, bevel pinion 25 provides a driving contact surface and the crown wheel 26 provides a driven contact surface. As is depicted in cross-section in FIG. 1, the bevel pinion 25 and crown wheel 26 meet at a line of engagement 27 that is at an angle $\psi_1$ to the longitudinal axis 24a of the drive shaft 24. Accordingly, rotation of the drive shaft 24 about its longitudinal axis 24a results in rotation of the wheel member 11 relative to support block 12 and so drives the wheel 10 over the surface 19. The curved outer surface of the tread 18 of the wheel member 11 is also intersected at rolling line 28 by the line of engagement 27.

By positioning the tread 18 such that it is intersected by the line of engagement 27, the wheel 10 has a number of advantages including:

(i) a steering motion of the steering shaft 22 when the drive shaft 24 is stationary does not lead to any movement of the chassis 21 as movement of the chassis 21 only occurs on rotation of the drive shaft 24;

(ii) a steering motion of the steering shaft 22 when the drive shaft 24 is stationary causes the tread 18 to travel in the path of a small circle about the longitudinal axis 24a, i.e. a rolling motion rather than a stick/slip motion, resulting in the chassis 21 remaining substantially stationary;

(iii) because rolling line 28 of the tread 18 is offset in cross-section relative to the longitudinal axis 24a of the drive shaft 24 at an angle equal to $\psi_1$, any torque transferred from the drive shaft 24 to the wheel member 11 in order to overcome the drive resistance is counterbalanced by the same drive resistance acting on the periphery of the tread where it contacts the surface 19;

(iv) there is no requirement for additional gear wheels to reverse the rotation of the steering support 22;

(v) the diameter of the crown wheel 26 can be at least 60%–70% of the effective diameter of the tread 18 resulting in a more reasonable relationship between the drive force and the gear wheel loading;

(vi) the axis of the wheel member 11 relative to the ground surface 19 can be between about 20–30°, thereby sharply reducing the amount of twist inherently combined with the rolling motion of the wheel member 11 over the surface 19 when a wheel axis is not parallel to the ground, thereby reducing wear on the surface 19 and reducing drive power losses; and (vii) the distance from rolling line 28 to the longitudinal axis 24a can be relatively small, thereby reducing the eccentricity of the load on the drive wheel 10.

The angles $\psi_1$, and $\psi_2$ are subject to the constraint that there must be a whole number of teeth on the bevel pinion 25 and on the crown wheel 26. For straight teeth this implies that $\sin\psi_1/\sin\phi_2$ must be the ratio between these two whole numbers. If the radius of the tread 18 of the wheel member 11 measured from the intersection of the line of engagement 27 and longitudinal axis 24a is R, then the radius of the circle of intersection between the ground surface and the opposite nappe of the pinion pitch cone is $R(\sin\psi_1)$. Denoting the angular velocity of the drive shaft 24 as $\omega_d$, the speed of travel of the wheel member 11 over the surface 19 wilt be $\omega_d R(\sin_{\psi_1})$ ms$^{-1}$ if R is measured in meters and $\psi_d$ in radians/second.

In the case of straight teeth, the angles can have the following values:

Example 1: $\psi_1=13°527$, $\psi_2=78°$, and $\psi_3=25°527$
Example 2: $\psi_1=13°421$, $\psi_2=78°$, and $\psi_3=25°421$ In the case of skewed teeth, the angles can have the following values:

Example 1: $\psi_1=12°00052$, $\psi_2=77°99948$, and $\psi_3=24°00104$

A further variation of the depicted wheels would be to use a plane crown wheel rather than one having its teeth adjacent to the first surface 16.

Figure 2:
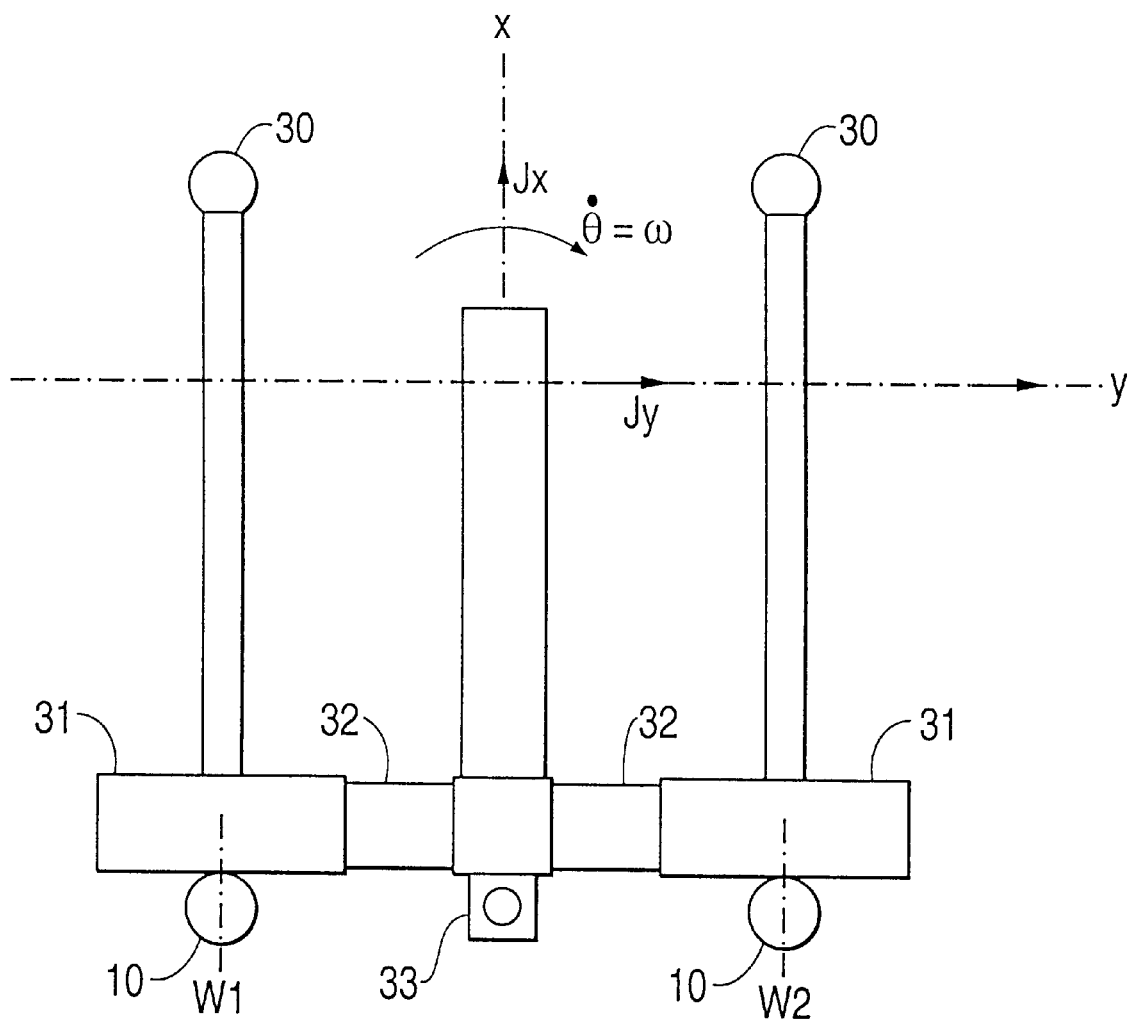
FIG. 2 is a simplified representation of a chassis having two drive wheels according to the present invention.

A simplified representation of a chassis having two drive wheels 10 and two standard non-driven wheels 30 is provided by FIG. 2. The chassis depicted in FIG. 2 is capable of undergoing change in lateral dimension simply by a movement of the respective drive wheels either relatively towards or away from each other. In this embodiment, the chassis can be understood as being comprised of two sub-carriages 31 having lateral members 32 that can telescopically or otherwise move with respect to each other. Movement of the carriages is provided simply by moving the two drive wheels 10 either towards or away from each other, thereby allowing the lateral dimension of the chassis to be adjusted. In the arrangement depicted in FIG. 2, the lateral members 32 move so as to ensure that the respective distances of the drive wheels 10 from a central linking housing 33 remain symmetrical relative to the housing 33. The capability of the chassis to adjust its lateral dimensions can be particularly useful when the chassis has to pass through a narrow opening such as a door. While the embodiment described in FIG. 2 is understood to have drive wheels 10 as depicted in FIG. 1, it will be readily understood by a person skilled in this area that other drive wheels could be utilized on the chassis if desired.

In assessing the operation of the drive motor and steering device for the drive wheels 10 on this chassis, it is useful to use a co-ordinate system that is in a plane parallel to the ground surface, with the x-axis defining the forwards/backwards movement and the y-axis the sideways movement of the chassis relative to an arbitrary reference point. In the depicted arrangement, forward movement from the reference point is considered movement in a positive direction along the x-axis and sideways movements to the right from the reference point is considered movement in a positive direction along the y-axis. Any rotation about the reference point is considered positive if the rotation is clockwise when viewed from above.

For the purpose of understanding the operation of the drive motor and steering device, reference will be made to the following definitions:

| SYMBOL | DESCRIPTION | DIMENSION |
|---|---|---|
| $J_x$ | Joystick X-command, normalised. | m/s |
| $J_y$ | Joystick Y-command, normalised. | m/s |
| $\omega$ | Joystick Turn command, normalised. | rad/s |
| U | Joystick speed command, normalised. | m/s |
| $W_x$ | Wheel X-co-ordinate | m |
| $W_y$ | Wheel Y-co-ordinate | m |
| $V_w$ | Wheel speed command | m/s |
| $V_{wx}$ | Wheel speed X-command | m/s |
| $V_{wy}$ | Wheel speed Y-command | m/s |
| $\varphi$ | Joystick deflection direction | radian |
| $\Psi$ | Wheel direction command | radian |
| $s'_y$ | $K_1(W_{yi} - W_{yo})$. SHIFT of $W_x$ and $W_y$. | m/s |
| $K_1$ | Shift time constant | $s^{-1}$ |
| $K_2$ | Rate feed forward | nondim |
| $K_3$ | Proportional gain | $s^{-1}$ |
| $K_4$ | Wheel offset | m |

Figure 3:
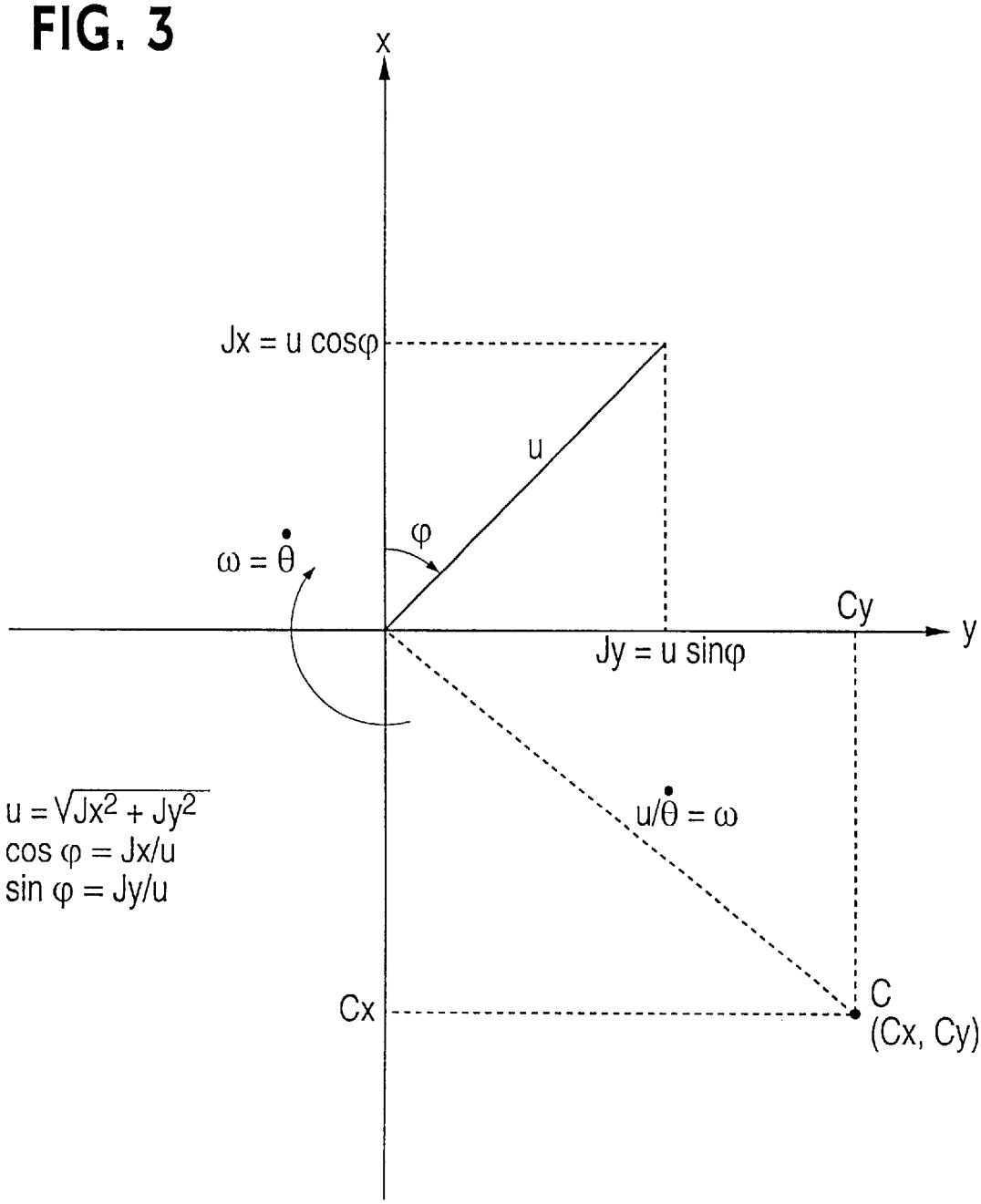
FIGS. 3 and 4 are representations of the motion geometry of a drive carriage of the chassis depicted in FIG. 2.
Figure 4:
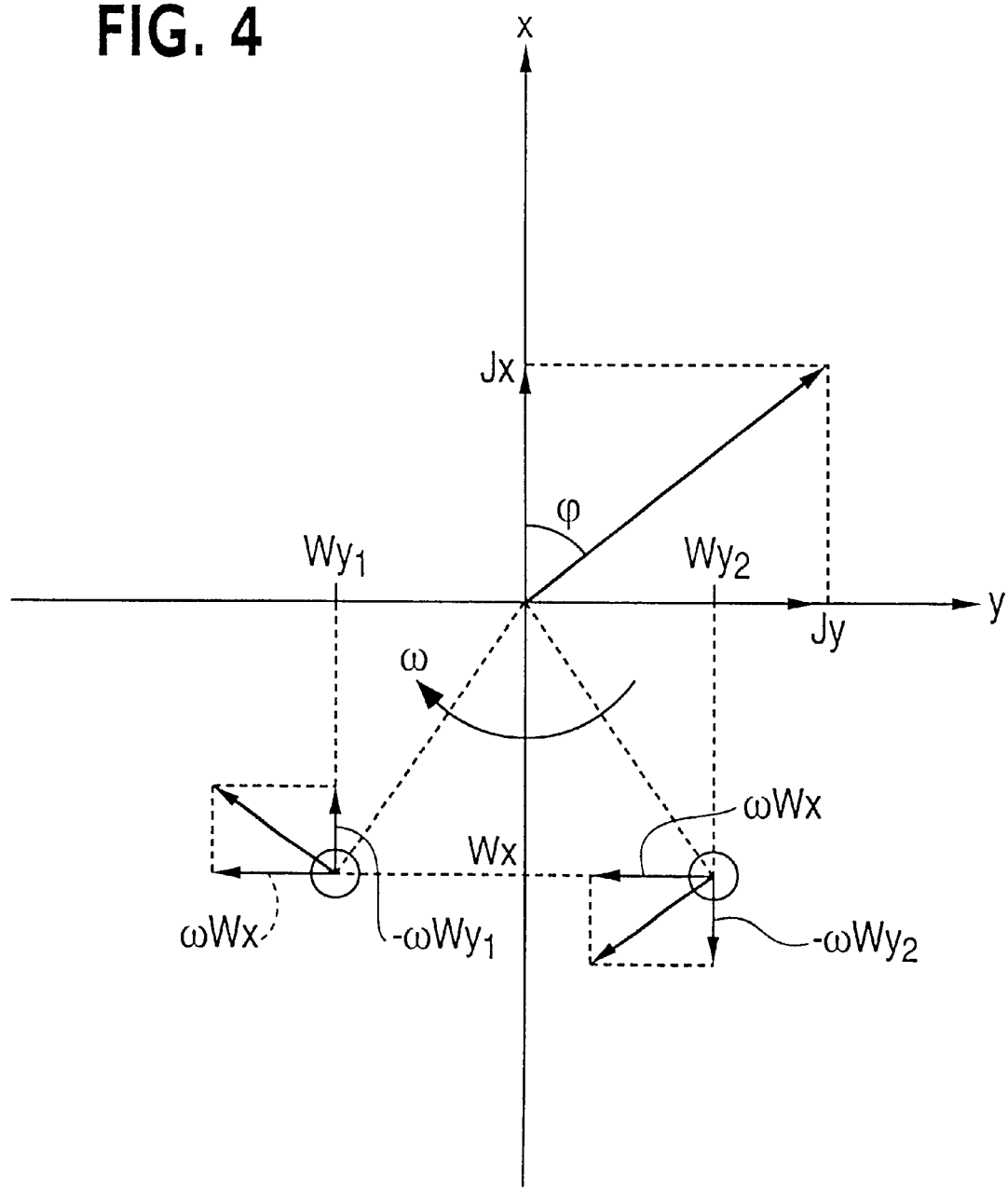

The general movement of a drive carriage 31 can be described at any given moment as a rotation about some arbitrary point on the ground surface, or as the linear superposition of a movement of pure translation and a rotation about the reference point. From this and using the motion geometry of FIGS. 3 and 4, the following control equations for each carriage 31 follow:

$$V_{wx} = J_x - \omega W_y$$

$$V_{wy} = J_y + \omega W_x + s'_y$$

$$V_w = \sqrt{(U\cos\varphi - \omega W_y)^2 + (U\sin\varphi + \omega W_x + s'_y)^2}$$
$$= \sqrt{(J_x - \omega W_y)^2 + (J_y + \omega W_x + s'_y)^2}$$

$$\cos\psi_i = \frac{U\cos\varphi - \omega W_y}{V_w} = \frac{J_x - \omega W_y}{V_w}$$

$$\sin\psi_i = \frac{U\sin\varphi + \omega W_x + s'_y}{V_w} = \frac{J_y + \omega W_x + s'_y}{V_w}$$

Figure 5:
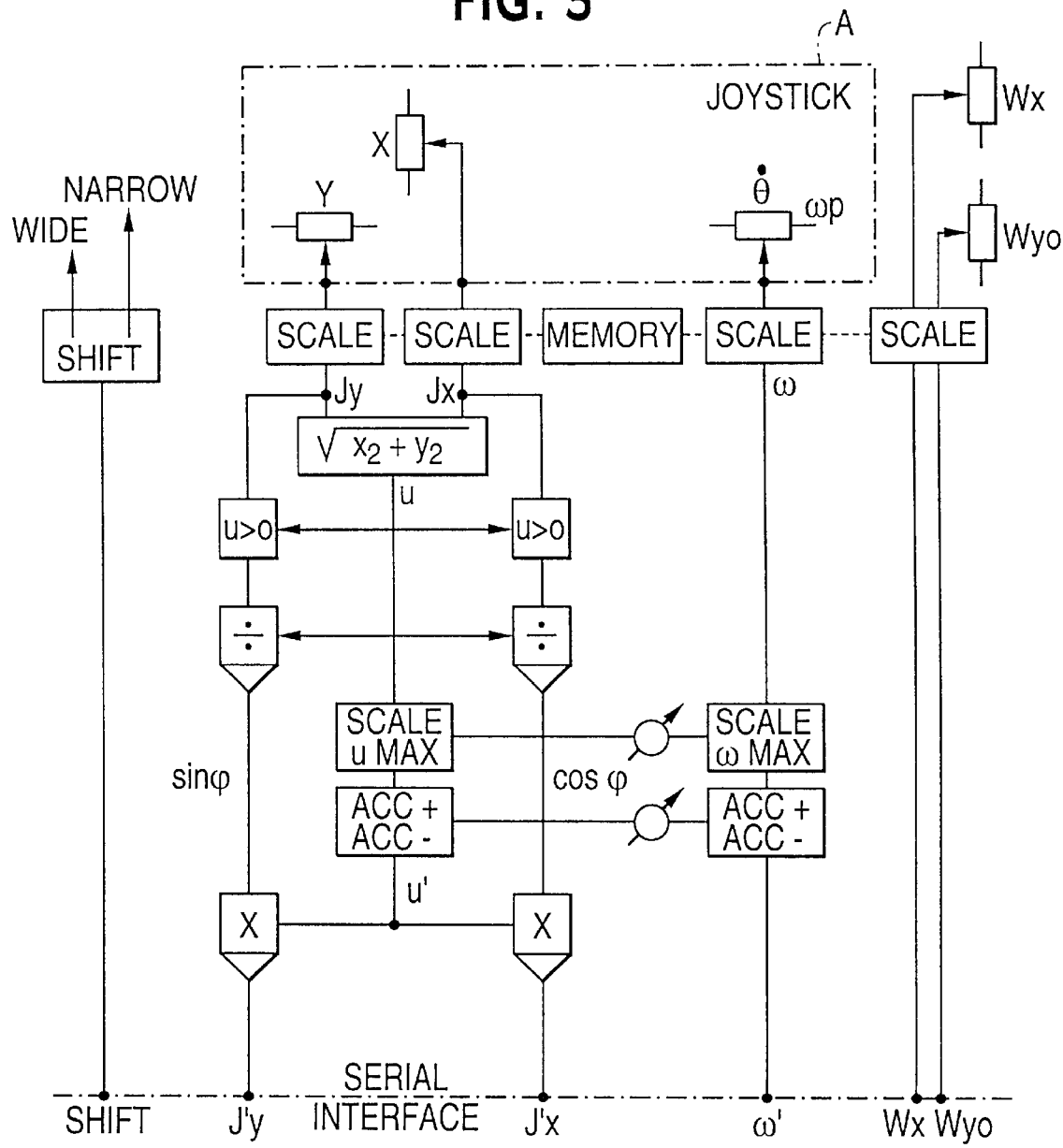
FIGS. 5 and 6 are schematic representations in block diagram form of a control strategy that can be used for the drive chassis depicted in FIG. 2.
Figure 6A:
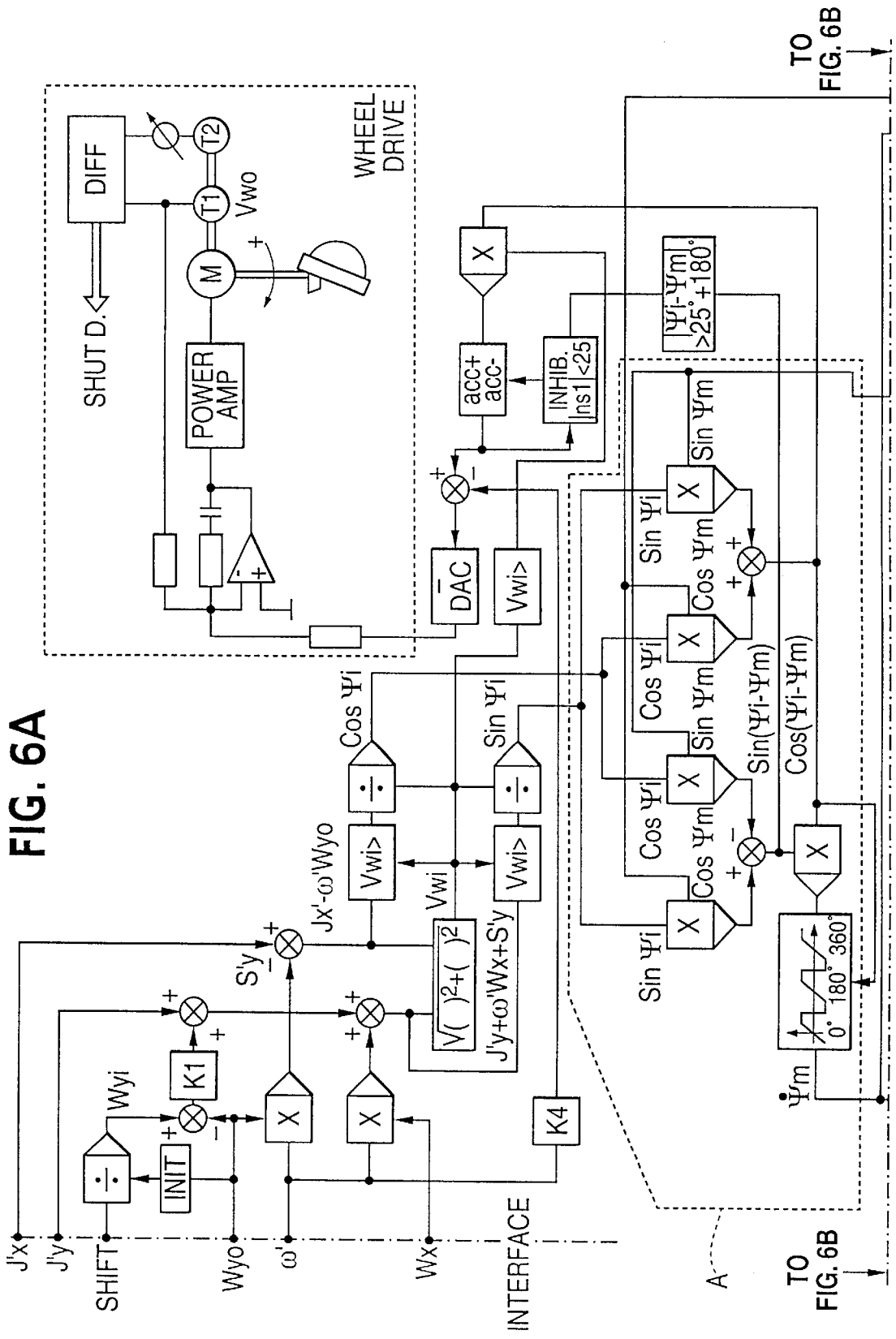
Figure 6B:
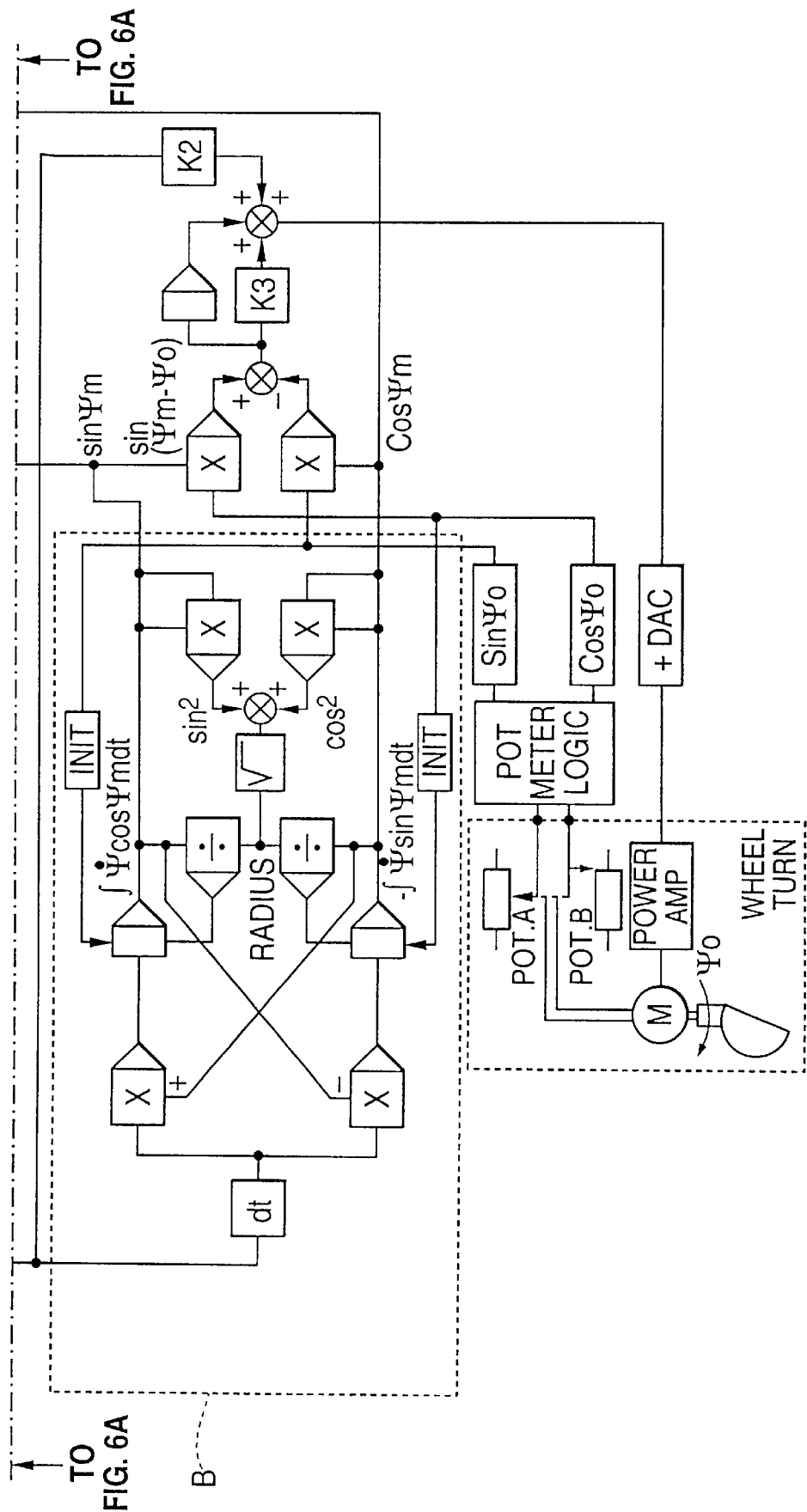

FIGS. 5 and 6 provide a schematic presentation in block-diagram form of a control strategy relevant to the drive chassis as depicted in FIG. 2. FIG. 5 provides a representation of the signals generated on movement of the joystick for the device by an operator. At the top of FIG. 5 in the region labelled A, representation is provided of the three signal transmitters in a tri-axial joystick as used for the depicted chassis, namely:

an x-potentiometer for the longitudinal command;

a y-potentiometer for the sideways command; and a $\omega_p$-potentiometer for the rotation command.

Further in a top right corner of FIG. 5 are found:

a $W_x$-potentiometer for manual setting of the $W_x$-co-ordinate; and a $W_{yo}$-potentiometer for the feedback of the actual $W_{yo}$-co-ordinate as measured by the telescopic movements between the two sub-carriages 31 of the chassis of FIG. 2.

All the values are subject to an ADC-conversion and then a subsequent scaling against predetermined maximum values to obtain identifiable dimensional values. The scale factors used in the scaling step are saved in memory when the power to the chassis is turned off.

After the digital scaling, the corresponding values $J_x$, $J_y$ and $\omega$ are in normalised form independent of individual joystick tolerances. The joystick speed components $J_x$ and $J_y$ are then combined to the normalised joystick speed command U. From these values are obtained $\sin\omega = J_y/U$ and $\cos\phi = J_x/U$ subject to U>0.

The two values U and $\omega$ are then modified through further scale factors to obtain suitable full scale deflection speeds in accordance with the operator's requirements. These modified values are U' and $\omega'$.

Subsequently, the modified command components $J'_x = U'\cos\phi$ and $J'_y = U'\sin\phi$ are obtained, with the method ensuring simultaneity between the two vector components $J'_x$ and $J'_y$. These values together with $\omega'$, $W_x$ and $W_{yo}$ are transferred as input values to the control strategy as depicted in the block diagram given as FIG. 6.

In the upper left corner of FIG. 6, it can be seen that the control strategy includes an integrator, with the output value $W_{yi}$, which is the instantaneous command value for the sideways distance $W_{yo}$ of each drive wheel from the centre line. During start-up of the chassis system, this integrator is initialised with $W_{yo} = W_{yi}$ in order to ensure a bump free start up of the system.

During operation the integrator accepts input commands from the two push buttons SHIFT-WIDE and SHIFT-NARROW (represented in FIG. 5) to increase or decrease the value of $W_{yi}$. The value $W_{y0}$ represents the distance of each drive wheel from the center line of the drive chassis and is to be taken as positive for the right hand drive wheel and negative for the left hand drive wheel. The difference between the two is sued to generate the correction $S'_y = K_1 (W_{yi} - W_{y0})$, which is added to the commands from the joystick in the sideways direction to the wheel control. This cause the wheels to approach the required distance between them in an exponential manner with a time constant equal to $K_1$ if the bandwidth of the subsequent control system is larger than $1/K_1$.

The remaining motion commands originate directly from joystick manipulations generating the two vector components $J'_x$ and $J'_y$ as well as $\omega'$, which combine with the shift command in accordance with the above formulae to generate the two wheel command vectors:

$$V_{wx} = J'_x - \omega' W_y \text{ (longitudinal direction); and}$$

$$V_{wy} = J'_y + \omega' W_x + s'_y \text{ (sideways direction).}$$

This set of wheel commands is generated separately for each drive wheel 10, and differs for each drive wheel as a result of the different drive wheel co-ordinates. From the root of the sum of squares of these two command vectors is derived the drive wheel command speed $V_{wi}$ which will always be a positive number.

Each of these vectors divided by $V_{wi}$ subject to $V_{wi} > 0$, generate $\sin\psi_i$ and $\cos\psi_1$, where $\Psi_i$ is the input command angle for the wheel drive direction.

The control strategy depicted in FIG. 6 uses a mathematical model of wheel turn, which is represented by part B in FIG. 6. This model consists mainly of two integrators executing the two relations:

$$\sin\psi_m = \int \dot{\psi}_m \cos\psi_m dt$$

$$\cos\psi_m = -\int \dot{\psi}_m \sin\psi_m dt$$

The input command to this model is the value $\dot{\psi}_m$ (required model rate of turn) which is generated in the angular difference determination section labelled a in FIG. 6, and which is discussed below. The terms to be integrated are generated by this input rate of turn and the output values of the model, $\cos\psi_m$ and $\sin\psi_m$, respectively.

The root of the sum of the squared output values is sued to maintain the integrator outputs on a unity radius value. The area labelled B in FIG. 6 thus constitutes an unlimited circular integrator of the input value $\dot\psi_m$.

The two integrators can, when required and particularly at power-up, be initialised with the values $\cos\psi_o$ and $\sin\psi_o$, representing the actual angular position of the physical drive wheel.

The purpose of the mathematical model developed at part B is to obtain a controlled rotation of the physical drive wheel with a known and noise-free value of $\dot\psi_m$ irrespective of any external disturbances of the physical drive wheel. The physical drive wheel is subsequently locked on to the mathematical model through a servomotor control loop as would be understood in the art. The input command value to this servomotor is the sine of the angular difference between the physical drive wheel and the mathematical model given by:

$$\sin(\psi_m-\psi_o)=\sin\psi_m \cos\psi_o-\cos\psi_m \sin\psi_o$$

The gain coefficient $K_3$ controls the bandwidth of this loop, and the feed-forward of $\dot\psi_m$ through the coefficient $K_2$ ensures, that the dynamic value of $\sin(\psi_m-\psi_o)$ is always small, $K_2$ having a value matching the required servomotor input for the rate of turn in question. The correspondence between the physical drive wheel and the mathematical model is thereby always high up to the torque limit of the wheel turn servomotor.

The area labelled a or the angular difference determination section FIG. 6 consists mainly of the four multipliers evaluating the terms:

$$\sin(\psi_i-\psi_m)=\sin\psi_i \cos\psi_m-\cos\psi_i \sin\psi_m$$

and $$\cos(\psi_i-\psi_m)=\cos\psi_i \cos\psi_m+\sin\psi_i \sin\psi_m$$

which identify the angular difference $(\psi_i-\psi_m)$ between the wheel turn model direction $\psi_m$ and the required direction $\psi_i$ of the physical wheel.

By one further multiplication is obtained the term:

$$\tfrac{1}{2}\sin 2(\psi_i-\psi_m)=\sin(\psi_i-\psi_m)\cos(\psi_i-\psi_m)$$

which identifies the double angular difference. Using this value as a command input $\dot\psi_m$ to the wheel turn model, two stable and two unstable balance conditions are obtained. The stable conditions are at $(\psi_i-\psi_m)=0$ and $(\psi_i-\psi_m)=\pi$, and the two unstable conditions are at $(\psi_i-\psi_m)=\pi/2$ and $(\psi_i-\psi_m)=3\pi/2$. The result is that the mathematical model and consequently also the physical wheel will line up either parallel to, or anti-parallel to, the required direction $\psi_i$. This saves time and energy in the wheel turn motion, because the wheel will never need to turn more than an angle $\pi/2$ to attain any new required direction. By subsequently multiplying the required wheel drive speed $V_{wi}$, which is always a positive value, with the term $\cos(\psi_i-\psi_m)$ and using $\cos(\psi_i-\psi_m) V_{wi}$ as the command value for wheel drive speed, it is ensured that motion of the drive wheel is always obtained in the correct direction irrespective of the two alignment possibilities.

Instead of directly using the term $\sin 2(\psi_i-\psi_m)$ directly as the command input to the wheel turn model, a modified version, which generates linear variation around the two stable balance conditions up to a well defined maximum value and suppresses actual zeroes at the unstable conditions, can also be employed.

As already mentioned, the term $\cos(\psi_i-\psi_m) V_{wi}$ applied as the input command. However, because the wheel tread is not moving along a trajectory traced out by a center axis of the wheel with its given co-ordinates, but a trajectory offset from this by the amount of the wheel offset, another term $\omega' K_4$, where $K_4$ is the wheel offset in meters, is subtracted from the wheel speed command. This compensates for the wheel tracing out a curve of a slightly modified radius.

The wheel speed command can be subject to some inhibitory and acceleration constraints to ensure smooth operation during varying operational conditions. Apart from the obvious limitations on speed, force and torque set by the control servomotors involved, a drive system can incorporate additional features. As a result of combined drive and turn movements of the total system, either wheel may get into the situation of receiving a drive command from a joystick which reduces in magnitude towards zero, passes through zero and again increases in the opposite direction. If this takes place exactly through zero, the control strategy described above is able to accommodate this command as the drive command just goes through zero and then comes up again opposite without changing the orientation of the wheel housing. However, in most cases the command will miss the exact zero point by a small amount, in which case the wheel, because of the polar co-ordinate nature of the system, will be called upon to turn very fast in order to follow the actual turning command. If the angular velocity limits of the wheel are exceeded, a jerking motion may be experienced in the drive motion of the total system. For this reason it is advantageous to set up restrictions on the fundamental command group of $J'_x$, $J'_y$, $\omega'$, and $s'_y$, such that $V_{wi}$ cannot get below a certain value if $U'>V_{wi}$. Such conditions can be set up in various ways, the details of which will relate to the actual application of the drive system.

As an example, one restriction could be as follows:

If $(V_{wi}<V_{wi,min})$ whilst $(U'>2V_{wi,min})$ then $[J'x+2V_{wi,min}\cos\psi_i, J'y+2V_{wi,min}\sin\psi_i]$ else $[J'x, J'y]$;

where $V_{wi,min}$ is a minimum value of $V_{wi}$ below which uncertainties in the orientation determination of the wheel housing may become unacceptable.

Other variations of the present invention will be readily apparent to those skilled in the art.

What is claimed is:

1. A drive wheel for traveling over a traveling surface, comprising:

a support member that is adapted to be mounted on a chassis so as to be rotatable in relation to the chassis about a steering axis extending substantially perpendicularly to the traveling surface;

a wheel member having a surface contacting portion extending about a periphery of said wheel member; and a drive shaft having a longitudinal axis, wherein said drive shaft includes a drive device that is immovably fixed relative to said drive shaft and is arranged to engage a drive surface that is immovably fixed relative to said wheel member and is on said wheel member such that said wheel member can be rotatably driven relative to said support member, wherein when said drive device is engaged with the drive surface a line of engagement is defined in a vertical cross-sectional plane along portions of said drive device and the drive surface that engage with each other, with the line of engagement forming an acute angle with said longitudinal axis such that when said drive wheel is traveling over the traveling surface, the line of engagement intersects a part of said surface contacting portion that contacts the traveling surface and, the part of said surface contacting portion that contacts the traveling surface is spaced from an intersection of the steering axis and the traveling surface.

2. The drive wheel according to claim 1, wherein said longitudinal axis extends substantially perpendicularly to the traveling surface when said drive wheel is traveling over the traveling surface.

3. The drive wheel according to claim 2, wherein the acute angle formed by the line of engagement and said longitudinal axis when said drive device is engaged with the drive surface is between about 10° and 25°.

4. The drive wheel according to claim 2, further comprising a driving mechanism for rotating said drive shaft.

5. The drive wheel according to claim 4, wherein said support member is mounted on a support shaft defining the steering axis.

6. The drive wheel according to claim 5, wherein said support shaft is rotatable about the steering axis, and further comprising a steering device to control rotation of said support shaft about the steering axis.

7. The drive wheel according to claim 6, further comprising a control unit for controlling said drive wheel, wherein said control unit includes said steering device.

8. The drive wheel according to claim 5, wherein said drive shaft extends through said support shaft.

9. The drive wheel according to claim 1, wherein said drive device comprises a gear member that is adjacent an end of said drive shaft, with said gear member having teeth thereon that are adapted to engage with teeth on said wheel member such that said drive device becomes engaged with the drive surface of said wheel member.

10. The drive wheel according to claim 1, wherein said support member includes a substantially hemispherical outer surface, and with said wheel member being rotatable about an axis extending perpendicular to an inner surface of said support member.

11. The drive wheel according to claim 10, wherein said wheel member comprises a frusto-spherical portion extending between a first surface and a second surface, with said first surface having a larger cross-sectional diameter than that of said second surface.

12. The drive wheel according to claim 11, wherein said surface contacting portion extends about a periphery of said frusto-spherical portion adjacent said first surface.

13. The drive wheel according to claim 12, wherein said surface contacting portion comprises an elastomeric material having a curved outer surface.

14. The drive wheel according to claim 1, further comprising a control system for controlling operation of a said drive wheel in a chassis having at least one said drive wheel for traveling over the traveling surface, wherein said control system is adapted to control a steering motion of a steering shaft and rotation of said drive shaft independently of each other such that movement of the chassis is performed solely by rotation of said drive shaft caused by a driving motor, and such that rotation of the steering shaft without rotation of said drive shaft by the driving motor results in substantially no movement of the chassis.

15. The drive wheel according to claim 14, wherein said control system is to control operation of said drive wheel by at least three transmitting signals, including signals from:

(i) an x-transmitter for a longitudinal command,
(ii) a y-transmitter for a lateral command, and
(iii) an ωp-transmitter for a rotation command.

16. The drive wheel according to claim 15, wherein the x-transmitter, the y-transmitter and the ωp-transmitter are combined on a joystick.

17. The drive wheel according to claim 15, wherein said control system is for adding a corrective amount to signals received from the x-transmitter, the y-transmitter and the ωp-transmitter if the signals received from the x-transmitter, the y-transmitter and the ωp-transmitter indicate that velocity of said wheel is less than a predetermined minimum velocity while velocity of said chassis is greater than a predetermined maximum velocity, such that instability in said chassis is avoided which would otherwise occur due to the velocity of said wheel suddenly shifting in direction.

18. A chassis having at least one drive wheel for traveling over a traveling surface, with said at least one drive wheel comprising:

a support member that is mounted on said chassis so as to be rotatable in relation to said chassis about a steering axis extending substantially perpendicularly to the traveling surface;

a wheel member having a surface contacting portion extending about a periphery of said wheel member; and a drive shaft having a longitudinal axis, wherein said drive shaft includes a drive device that is immovably fixed relative to said drive shaft and is arranged to engage a drive surface that is immovably fixed relative to said wheel member and is on said wheel member such that said wheel member can be rotatably driven relative to said support member, wherein when said drive device is engaged with the drive surface a line of engagement is defined in a vertical cross-sectional plane along portions of said drive device and the drive surface that engage with each other, with the line of engagement forming an acute angle with said longitudinal axis such that when said drive wheel is traveling over the traveling surface, the line of engagement intersects a part of said surface contacting portion that contacts the traveling surface and, the part of said surface contacting portion that contacts the traveling surface is spaced from an intersection of the steering axis and the traveling surface.

19. The chassis according to claim 18, wherein said longitudinal axis of said drive shaft extends substantially perpendicularly to the traveling surface when said at least one drive wheel is traveling over the traveling surface.

20. The chassis according to claim 19, wherein the acute angle formed by the line of engagement of said longitudinal axis of said drive shaft when said drive device is engaged with the drive surface is between about 10° and 25°.

21. The chassis according to claim 18, further comprising a driving mechanism for rotating said drive shaft.

22. The chassis according to claim 18, wherein said drive device comprises a gear member that is adjacent an end of said drive shaft, with said gear member having teeth thereon that are adapted to engage with teeth on said wheel member such that said drive device becomes engaged with the drive surface of said wheel member.

23. The chassis according to claim 18, wherein said support member is mounted on a support shaft defining the steering axis.

24. The chassis according to claim 23, wherein said support shaft is rotatable about the steering axis, and further comprising a steering device to control rotation of said support shaft.

25. The chassis according to claim 24, further comprising a controlling device for controlling operation of said steering device and said drive shaft.

26. The chassis according to claim 23, wherein said drive shaft extends through said support shaft, with said support shaft being tubular.

27. The chassis according to claim 18, wherein said support member includes a substantially hemispherical outer surface, and with said wheel member being rotatable about an axis extending perpendicular to an inner flat surface of said support member.

28. The chassis according to claim 27, wherein said wheel member comprises a frusto-spherical portion extending between a first surface and a second surface, with said first surface having a larger cross-sectional diameter than that of said second surface.

29. The chassis according to claim 28, wherein said surface contacting portion extends about a periphery of said frusto-spherical portion adjacent said first surface.

30. The chassis according to claim 29, wherein said surface contacting portion comprises an elastomeric material having a curved outer surface.

31. The chassis according to claim 18, wherein said chassis is for a wheeled vehicle that is adapted to carry a load.

32. The chassis according to claim 31, wherein said chassis is for a wheeled vehicle that is adapted to carry a load, with the wheeled vehicle selected from the group consisting of a wheelchair, a patient hoist, a shower chair, a commode chair, a transport chair, a walking aid, a fork lift, a pallet mover, a work table, a robot, a distribution trolley, a mobile platform for camera and lighting equipment, a luggage and shopping trolley, a hospital bed, a hospital cabinet, a hospital waste container, a construction vehicle, an earth moving vehicle, a mining vehicle and a bomb disposal vehicle.

33. The chassis according to claim 18, wherein said at least one drive wheel comprises at least two drive wheels, with at least one of said at least two drive wheels being mounted on a first drive carriage and with at least another of said at least two drive wheels being mounted on a second drive carriage, and wherein said at least one of said at least two drive wheels can move relatively towards said at least another of said at least two drive wheels.

34. The chassis according to claim 33, wherein said first drive carriage includes lateral members and said second drive carriage includes lateral members, with said lateral members of said first drive carriage being movably engageable with one another upon movement of said at least one of said at least two drive wheels and said at least another of said at least two drive wheels respectively towards each other, and with said lateral members of said second drive carriage being movably engageable with one another upon movement of said at least one of said at least two drive wheels and said at least another of said at least two drive wheels respectively towards each other.

35. The chassis according to claim 34, wherein one of said lateral members of said first drive carriage and one of said lateral members of said second drive carriage comprise respective portions of a housing located between said at least one of said at least two drive wheels and said at least another of said at least two drive wheels.

36. The chassis according to claim 35, wherein said housing is constructed and arranged to remain midway between said at least one of said at least two drive wheels and said at least another of said at least two drive wheels upon movement of said at least one of said at least two drive wheels and said at least another of said at least two drive wheels respectively towards each other.

37. The chassis according to claim 34, wherein said lateral members of said first drive carriage are movably engageable with one another upon movement of said at least one of said at least two drive wheels and said at least another of said at least two drive wheels respectively towards each other by being telescopically engageable with one another, and wherein said lateral members of said second drive carriage are movably engageable with one another upon movement of said at least one of said at least two drive wheels and said at least another of said at least two drive wheels respectively towards each other by being telescopically engageable with one another.

38. The chassis according to claim 37, wherein said lateral members of said first drive carriage are movably engageable with one another upon movement of said at least one of said at least two drive wheels and said at least another of said at least two drive wheels respectively towards each other by having another of said lateral members of said first drive carriage be telescopically engageable with one of the respective portions of said housing, and said lateral members of said second drive carriage are movably engageable with one another upon movement of said at least one of said at least two drive wheels and said at least another of said at least two drive wheels respectively towards each other by having another of said lateral members of said second drive carriage by telescopically engageable with another of the respective portions of said housing.

39. The chassis according to claim 38, wherein said housing is constructed and arranged to remain midway between said at least one of said at least two drive wheels and said at least another of said at least two drive wheels upon movement of said at least one of said at least two drive wheels and said at least another of said at least two drive wheels respectively towardseach other.

40. The chassis according to claim 18, further comprising at least three signal transmitters to control motion of said chassis, wherein said at least three signals transmitted include
   (i) an x-potentiometer for longitudinal motion control of said chassis,
   (ii) a y-potentiometer for lateral motion control of said chassis, and
   (iii) a ωp-potentiometer for rotational motion control of said chassis.

41. The chassis according to claim 40, wherein said at least three signal transmitters are combined in a joystick.

42. The chassis according to claim 40, further comprising a control system for adding a corrective amount to signals received from said at least three signal transmitters if the signals received from said at least three signal transmitters indicate that velocity of said wheel is less than a predetermined minimum velocity while velocity of said chassis is greater than a predetermined maximum velocity, such that instability in said chassis is avoided which would otherwise occur due to the velocity of said wheel suddenly shifting in direction.

43. A method of controlling operation of a drive wheel for traveling over a traveling surface, wherein the drive wheel comprises
   (i) a support member that is mounted on a chassis so as to be rotatable in relation to the chassis about a steering axis extending substantially perpendicularly to the traveling surface, with the steering axis being defined by a steering shaft;
   (ii) a wheel member having a surface contacting portion extending about a periphery of said wheel member; and (iii) a drive shaft having a longitudinal axis, wherein said drive shaft includes a drive device that is immovably fixed relative to said drive shaft and is arranged to engage a drive surface that is immovably fixed relative to said wheel member and is on said wheel member such that said wheel member can be rotatably driven relative to said support member, wherein when said drive device is engaged with the drive surface a line of engagement is defined in a vertical cross-sectional plane along portions of said drive device and the drive surface that engage with each other, with the line of engagement forming an acute angle with said longitudinal axis such that, when the drive wheel is traveling move the traveling surface, the line of engagement intersects a part of said surface contacting portion that contacts the traveling surface and, the part of said surface contacting portion that contacts the traveling surface is spaced from an intersection of the steering axis and the traveling surface, said method comprising:

controlling a steering motion of the steering shaft and rotation of the drive shaft independently of each other such that movement of the chassis is performed solely by rotation of the drive shaft, which rotation is caused by a driving motor, and such that rotation of the steering shaft without rotation of the drive shaft by the driving motor results in substantially no movement of the chassis.

44. The method according to claim 43, wherein controlling of the steering motion of the steering shaft is performed in response to at least three transmitting signals, including signals from:

(i) an x-transmitter for a longitudinal command, (ii) a y-transmitter for a lateral command, and (iii) an ωp-transmitter for a rotation command.

45. The method according to claim 44, wherein the x-transmitter, the y-transmitter and the ωp-transmitter are combined in a joystick, and further comprising controlling the steering motion by operating the joystick.

46. The method according to claim 44, further comprising adding a corrective amount to signals received from the x-transmitter, the y-transmitter and the ωp-transmitter if the signals received from the x-transmitter, the y-transmitter and the ωp-transmitter indicate that velocity of the wheel is less than a predetermined minimum velocity while velocity of the chassis is greater than a predetermined maximum velocity, such that instability in said chassis is avoided which would otherwise occur due to the velocity of the wheel suddenly shifting in direction.

47. A drive wheel for supporting a chassis while traveling over a ground or floor surface, comprising:

a support member that is adapted to be mounted on the chassis so as to be rotatable in relation to the chassis about a steering axis extending substantially perpendicularly to the ground or floor surface;

a wheel member mounted on said support member so as to be rotatable relative to said support member about a first axis, with said wheel member having an annular ground contact surface thereon that defines a plane that is perpendicular to the first axis; and a driving member that is rotatably mounted about a second axis, with said driving member having a driving contact surface thereon that is immovably fixed relative to said driving member, wherein said driving contact surface is arranged to engage with a corresponding driven contact surface that is immovably fixed relative to said wheel member and is provided on said wheel member so as to rotate said wheel member relative to said support member, wherein when said driving contact surface is engaged with the corresponding driven contact surface a line of engagement is defined in a plane, containing the first and second axes, along portions of said driving contact surface and the corresponding driven contact surface that engage with each other, with the line of engagement intersecting said annular ground contact surface at a point that is spaced from a point of intersection of the steering axis and the ground or floor surface when said drive wheel is traveling over the ground or floor surface.

48. The drive wheel according to claim 47, wherein the second axis is substantially perpendicular to the ground or floor surface when said drive wheel is traveling over the ground or floor surface.

49. The drive wheel according to claim 48, wherein the line of engagement and the second axis form an angle of between 10° and 25°.

50. The drive wheel according to claim 49, wherein said driving member comprises a bevel gear and the corresponding driven contact surface comprises a crown wheel.

51. The drive wheel according to claim 50, wherein said support member is mounted on a rotatable, hollow support shaft that defines the steering axis, with said bevel gear being arranged on a drive shaft extending through said rotatable, hollow support shaft.

* * * * *

UNITED STATES PATENT AND TRADEMARK OFFICE
CERTIFICATE OF CORRECTION

PATENT NO. : 6,474,434 B1
DATED : November 5, 2002
INVENTOR(S) : Mogens Ilsted Bech It is certified that error appears in the above-identified patent and that said Letters Patent is hereby corrected as shown below:

Drawings,
Fig. 6A should be replaced by Fig. 6A as provided herewith. A marked-up copy of Fig. 6A of the patent is provided to show how it differs from Fig. 6A provided herewith.

Column 2,
Lines 46-47, change "is not aligned with the longitudinal axis of the support shaft" to -- is positioned such that it is intersected by the line of engagement substantially where it contacts the surface, --.

Column 5,
Line 44, change "27, the wheel" to -- 27 at the point of contact 28 with the ground surface, the wheel --.

Column 6,
Line 23, change "wilt" to -- will --.

Column 7,
Line 20, change "$\Psi$" to -- $\psi$ --.
Line 58, change "a" to -- an --.

Column 8,
Line 34, change "sued" to -- used --
Line 56, change "$\Psi$" to -- $\psi$ --.

Column 9,
Line 1, change "a" to -- A --.
Line 5, change "sued" to -- used --.
Line 20, change "servomotor" to -- servo --.
Line 29, change "servomoto" to -- servo --.
Line 34, change "a" to -- A --.

UNITED STATES PATENT AND TRADEMARK OFFICE
CERTIFICATE OF CORRECTION

PATENT NO. : 6,474,434 B1
DATED : November 5, 2002
INVENTOR(S) : Mogens Ilsted Bech It is certified that error appears in the above-identified patent and that said Letters Patent is hereby corrected as shown below:

Column 10,
Line 13, change "slightly modified radius." to -- slightly modified radius in a turning condition. --.
Line 16, delete "Apart from".
Line 17, add -- Apart from -- before "the obvious" as a start of a new paragraph.

Signed and Sealed this

Thirteenth Day of April, 2004

JON W. DUDAS
*Acting Director of the United States Patent and Trademark Office*

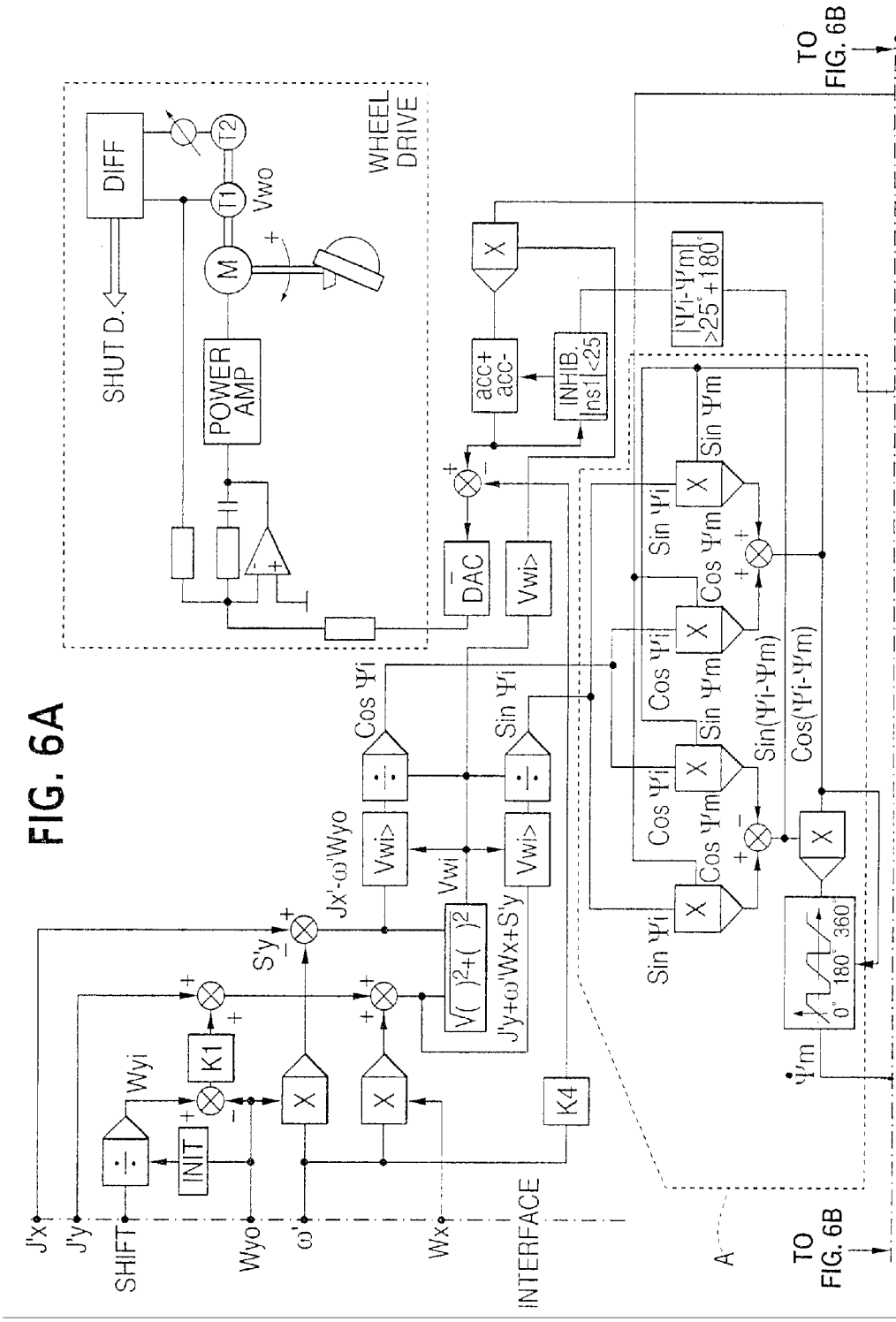

UNITED STATES PATENT AND TRADEMARK OFFICE
CERTIFICATE OF CORRECTION

PATENT NO. : 6,474,434 B1
DATED : November 5, 2002
INVENTOR(S) : Mogens Ilsted Bech It is certified that error appears in the above-identified patent and that said Letters Patent is hereby corrected as shown below:

<u>Column 9,</u>
Line 34, change "or" to -- of --.

Signed and Sealed this

Twelfth Day of October, 2004

JON W. DUDAS
*Director of the United States Patent and Trademark Office*